United States Patent
Donderici

(10) Patent No.: US 11,846,745 B2
(45) Date of Patent: *Dec. 19, 2023

(54) DOWNHOLE RANGING FROM MULTIPLE BOREHOLES

(71) Applicant: Halliburton Energy Services, Inc., Houston, TX (US)

(72) Inventor: Burkay Donderici, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 649 days.

This patent is subject to a terminal disclaimer.

(21) Appl. No.: 16/991,650

(22) Filed: Aug. 12, 2020

(65) Prior Publication Data

US 2020/0371266 A1    Nov. 26, 2020

Related U.S. Application Data

(62) Division of application No. 14/759,519, filed as application No. PCT/US2013/030291 on Mar. 11, 2013, now Pat. No. 10,775,528.

(51) Int. Cl.

| | |
|---|---|
| G01V 3/38 | (2006.01) |
| E21B 47/022 | (2012.01) |
| E21B 7/00 | (2006.01) |
| G01V 3/28 | (2006.01) |
| E21B 43/30 | (2006.01) |
| E21B 43/24 | (2006.01) |
| E21B 41/00 | (2006.01) |

(Continued)

(52) U.S. Cl.
CPC ............ *G01V 3/38* (2013.01); *E21B 7/00* (2013.01); *E21B 41/0035* (2013.01); *E21B 43/2408* (2013.01); *E21B 43/305* (2013.01); *E21B 47/022* (2013.01); *E21B 47/0228* (2020.05); *E21B 47/13* (2020.05); *G01V 3/28* (2013.01)

(58) Field of Classification Search
None
See application file for complete search history.

(56) References Cited

U.S. PATENT DOCUMENTS

| | | |
|---|---|---|
| 2002/0000808 A1 | 1/2002 | Nichols |
| 2003/0213620 A1 | 11/2003 | Krueger |
| 2004/0020691 A1 | 2/2004 | Krueger |

(Continued)

*Primary Examiner* — Lina Cordero
(74) *Attorney, Agent, or Firm* — Benjamin Ford; Parker Justiss, P.C.

(57) ABSTRACT

Downhole ranging from multiple wellbores. In one example, multiple transmitters and multiple receivers are disposed in multiple wellbores to exchange electromagnetic signals. By implementing a full compensation technique, a computer system determines multiple compensated signals. A compensated signal is determined from a signal received from a first wellbore and a second signal received from a second wellbore. In another example, a first transmitter is disposed in a first wellbore, a first receiver is disposed in a second wellbore, and either a second transmitter or a second receiver is disposed in either the first wellbore or the second wellbore. By implementing partial compensation techniques, a computer system determines compensated signals. Using the compensated signals, the computer system determines a position of a first wellbore relative to a second wellbore, and provides the position.

16 Claims, 6 Drawing Sheets

(51) Int. Cl.
  *E21B 47/13* (2012.01)
  *E21B 47/0228* (2012.01)

(56) References Cited

U.S. PATENT DOCUMENTS

| | | | |
|---|---|---|---|
| 2004/0046559 A1* | 3/2004 | Flanagan | G01V 3/30 |
| | | | 324/338 |
| 2005/0088180 A1* | 4/2005 | Flanagan | G01V 13/00 |
| | | | 324/338 |
| 2007/0144782 A1 | 6/2007 | Krueger et al. | |
| 2007/0278008 A1 | 12/2007 | Kuckes et al. | |
| 2008/0041626 A1 | 2/2008 | Clark | |
| 2009/0114039 A1 | 5/2009 | Schultze et al. | |
| 2009/0164127 A1 | 6/2009 | Clark | |
| 2009/0178850 A1 | 7/2009 | Waters et al. | |
| 2009/0194333 A1 | 8/2009 | MacDonald | |
| 2009/0201025 A1 | 8/2009 | McElhinney | |
| 2009/0201026 A1 | 8/2009 | McElhinney | |
| 2010/0044108 A1 | 2/2010 | Bespalov et al. | |
| 2010/0277177 A1 | 11/2010 | Alumbaugh et al. | |
| 2010/0307742 A1* | 12/2010 | Phillips | E21B 47/04 |
| | | | 166/250.01 |
| 2010/0308832 A1 | 12/2010 | Clark et al. | |
| 2011/0006773 A1 | 1/2011 | Bittar | |
| 2011/0018542 A1 | 1/2011 | Clark et al. | |
| 2011/0121835 A1 | 5/2011 | Brune et al. | |
| 2011/0282583 A1 | 11/2011 | Clark | |
| 2012/0194195 A1 | 8/2012 | Wisler et al. | |
| 2014/0132420 A1* | 5/2014 | Liu | G01V 3/28 |
| | | | 340/853.1 |

\* cited by examiner

DOWNHOLE RANGING FROM MULTIPLE BOREHOLES

CROSS-REFERENCE TO RELATED APPLICATIONS

This application is a divisional application of U.S. patent application Ser. No. 14/759,519, filed by Burkay Donderici on Jul. 7, 2015, entitled "DOWNHOLE RANGING FROM MULTIPLE BOREHOLES," which is a U.S. National Stage of International Application No. PCT/US2013/030291, filed on Mar. 11, 2013, wherein the above-listed applications are commonly assigned with the present application and are incorporated herein by reference in their entirety.

TECHNICAL FIELD

The present disclosure relates to software, computer systems, and computer-implemented media used in forming wellbores in subsurface formations containing hydrocarbons.

BACKGROUND

Wellbores formed in subterranean hydrocarbon reservoirs enable recovery of a portion of the hydrocarbons using production techniques. The hydrocarbons can adhere to the reservoirs, for example, due to a combination of capillary forces, adhesive forces, cohesive forces, and hydraulic forces. Steam-assisted gravity drainage (SAGD) is an example of an enhanced hydrocarbon recovery technique in which heated treatment fluids (for example, steam) can be applied to the formation to facilitate and enhance recovery of the hydrocarbons that are adhered to the formation. In an implementation of the SAGD technique, an injection wellbore can be formed adjacent to a production wellbore, and the heated treatment fluids can be injected through the injection wellbore into the formation surrounding the production wellbore. The heated fluids can decrease an adherence of the hydrocarbons to the formation, thereby releasing the hydrocarbons into the production wellbore.

While forming (for example, drilling) the injection wellbore, knowledge of a location of the production wellbore relative to the injection wellbore can be important. Ranging is an example of a method to control a position of a wellbore being drilled relative to an existing wellbore. In ranging, an electromagnetic source located in the existing wellbore provides electromagnetic signals received by sensors in the wellbore being drilled. In another example of ranging, both the electromagnetic source and the sensors can be located in the wellbore being drilled. Several conditions, for example, wellbore drilling conditions, can adversely affect an ability of the electromagnetic source or the sensors (or both) to exchange the electromagnetic signals, and, consequently, affect ranging in the wellbores.

SUMMARY

In one aspect, a system for ranging in wellbores is disclosed. In one embodiment, the system includes: a first transmitter disposed in a first wellbore to transmit electromagnetic signals; a first receiver disposed in a second wellbore to receive the electromagnetic signals transmitted by the first transmitter; either a second transmitter or a second receiver disposed in either the first wellbore or the second wellbore to communicate electromagnetic signals with the first transmitter or the first receiver; and a processor connected to the first transmitter, the first receiver, and either the second transmitter or the second receiver. The processor is configured to: receive a plurality of signals communicated by the first transmitter, the first receiver, and either the second transmitter or the second receiver, wherein the plurality of signals includes a signal that corresponds to an electromagnetic signal received by the first receiver from the first transmitter; implement compensation techniques on the plurality of signals resulting in a plurality of compensated signals; process the plurality of compensated signals to determine a position of a first wellbore of the plurality of wellbores relative to a second wellbore of the plurality of wellbores; and provide the position of the first wellbore relative to the second wellbore.

In another aspect, a computer-readable medium storing instructions executable by a processor to perform operations for ranging in wellbores is disclosed. In one embodiment, the operations include: receiving a plurality of signals communicated between a first transmitter disposed in a first wellbore to transmit electromagnetic signals, a first receiver disposed in a second wellbore to receive the electromagnetic signals transmitted by the first transmitter, and either a second transmitter or a second receiver disposed in either the first wellbore or the second wellbore to communicate electromagnetic signals with the first transmitter or the first receiver, wherein the plurality of signals includes a signal that corresponds to an electromagnetic signal received by the first receiver from the first transmitter; implementing compensation techniques on the plurality of signals resulting in a compensated plurality of signals; processing the compensated plurality of signals to determine a position of a first wellbore of the plurality of wellbores relative to a second wellbore of the plurality of wellbores; and providing the position of the first wellbore relative to the second wellbore.

In yet another aspect, a method for ranging in wellbores is disclosed. In one embodiment, the method includes: receiving, by a processor, a plurality of signals communicated between a first transmitter disposed in a first wellbore to transmit electromagnetic signals, a first receiver disposed in a second wellbore to receive the electromagnetic signals transmitted by the first transmitter, and either a second transmitter or a second receiver disposed in either the first wellbore or the second wellbore to communicate electromagnetic signals with the first transmitter and the first receiver, wherein the plurality of signals includes a signal that corresponds to an electromagnetic signal received by the first receiver from the first transmitter; implementing, by the processor, compensation techniques on the plurality of signals resulting in a compensated plurality of signals; processing, by the processor, the compensated plurality of signals to determine a position of a first wellbore of the plurality of wellbores relative to a second wellbore of the plurality of wellbores; and providing, by the processor, the position of the first wellbore relative to the second wellbore.

DESCRIPTION OF DRAWINGS

Like reference symbols in the various drawings indicate like elements.

DETAILED DESCRIPTION

Figure 1A:
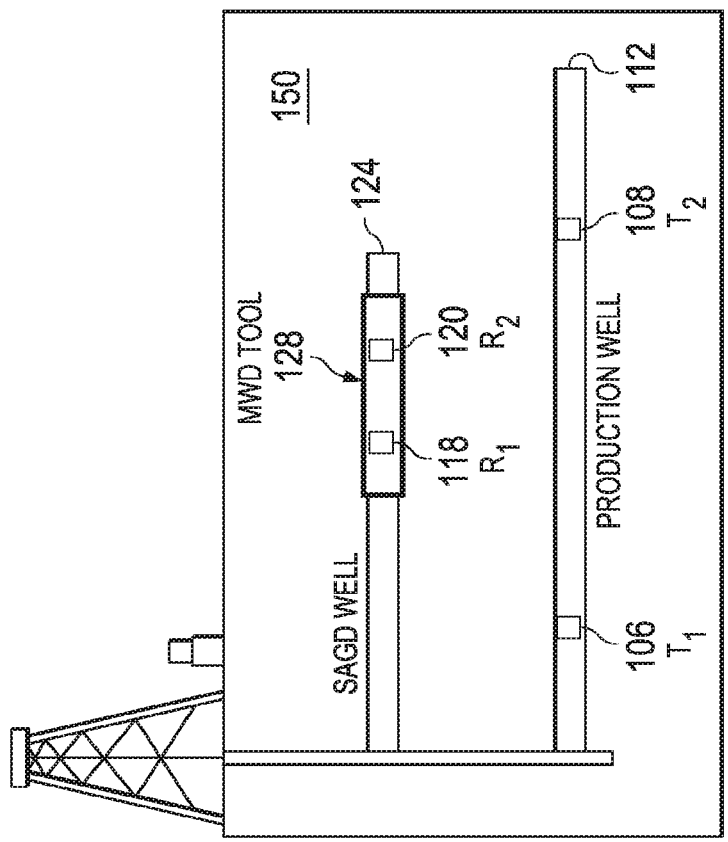
FIGS. 1A-1D are schematic, elevation views illustrating examples of multiple wellbores for ranging.

This disclosure relates to computer-implemented methods, computer systems, and computer-readable media for downhole ranging from multiple wellbores using compensated electromagnetic measurements. In the example of a SAGD application, precise ranging of the steam injection wellbore can be important. If the injection wellbore intersects the production wellbore, a blowout can result from the pressure difference between the wells. If the steam injection wellbore is too far from the production wellbore, the steam injection may not result in significant increased recovery. The ranging process described here can be used to determine the distance and precise location while drilling the injection wellbore.

Ranging focuses on changes in the positions of electromagnetic transmitters and receivers to provide precise measurements. The transmitters and receivers are disposed in wellbores for ranging. For example, the transmitters can be placed in a production wellbore and receivers in a wellbore that is being drilled (for example, for steam injection). The strength of the transmitters and receivers may not precisely be known. There can be a degree of variability associated with differences in manufacturing, differences in electronics, temperature changes, or combinations of them. In addition, an electromagnetic signal may experience changes, for example, in an approaching target well. Compensation is a technique that can be used to eliminate or minimize such effects that can adversely affect measurement of the electromagnetic signals. For example, compensation can eliminate or minimize the effects of elements (for example, manufacturing differences, electronic differences, temperature changes, and the like) to ensure that the remaining changes observed and measured are relevant to the ranging application.

As described below, one or both of two types of compensation—namely, partial compensation and full compensation—can be applied to ranging from multiple wellbores used, for example, in enhanced hydrocarbon recovery. In full compensation implementations, for example, multiple electromagnetic signal transmitters and multiple electromagnetic receivers can be located in a production wellbore and an injection wellbore, respectively. In partial compensation implementations, for example, one electromagnetic signal transmitter and two electromagnetic sensors or two electromagnetic signal transmitters and one electromagnetic sensor can be located in a production wellbore and an injection wellbore, respectively. The production wellbore can be an existing wellbore; the injection wellbore can be one that is being drilled adjacent the production wellbore for steam injection. A computer system described below can implement either or both compensation techniques when interpreting changes in electromagnetic signals between the one or more transmitters and the one or more receivers to eliminate or minimize some or all of the adverse effects described above. For example, by implementing the partial or full compensation technique, the computer system can eliminate or minimize confounding effects of any type of amplitude or phase shift that can be attributable to electronic drift, drift as a result of temperature change, or unknown phase or amplitude. After the computer system implements the partial or full compensation technique (or both), the computer system can use changes observed in the electromagnetic signal as the basis for measurements for use in ranging the injection wellbore.

Implementing partial or full compensation techniques (or both) on the electromagnetic signals prior to ranging can decrease a reliance on other correction or calibration techniques that are either complicated or impose strict requirements on electronics. Relative to the other correction/calibration techniques, the compensation technique can ease requirements on electronics and result in simpler and more robust measurements. The compensation techniques described below can provide extended coverage in the area of ranging. The measurements can be more accurate and robust than conventional compensation techniques. The compensation techniques can also provide more design flexibility in electronics or mechanics (or both) implemented in enhanced hydrocarbon recovery techniques, such as SAGD. The compensation can correct for the effect of temperature, fatigue or corrosion on sensor electronics such as amplitude or phase drifts. The compensation can also allow easier deployment of sensors since no in-situ calibration is required.

Figure 1B:
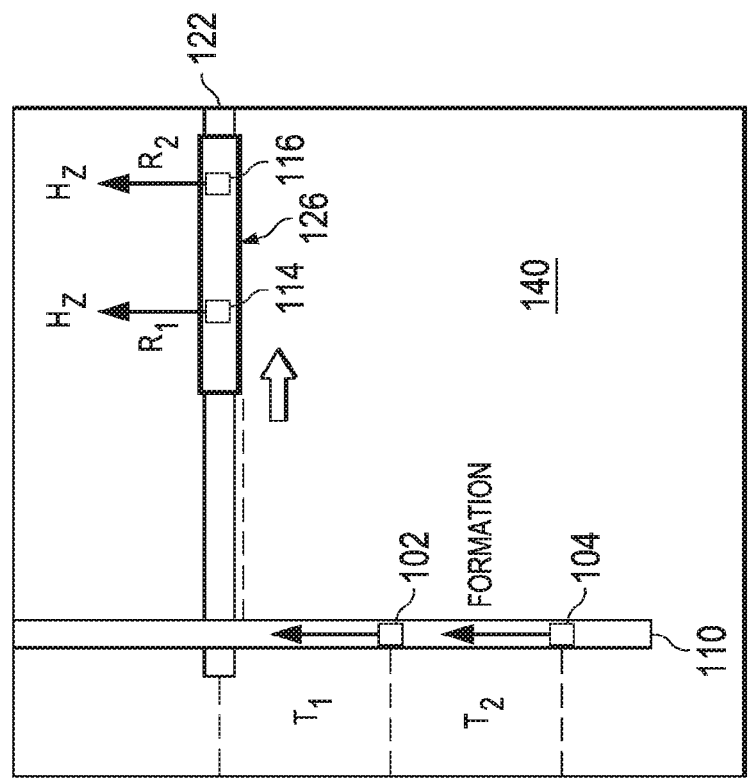

FIGS. 1A and 1B are schematic, elevation views illustrating examples of multiple wellbores for ranging implementing full compensation. In some implementations, multiple transmitters (for example, a first transmitter 102, a second transmitter 104) can be disposed in multiple wellbores (for example, a first wellbore 110, a second wellbore 122). Each transmitter (i.e., the first transmitter 102, the second transmitter 104) can transmit electromagnetic signals. Multiple receivers (for example, a first receiver 114, a second receiver 116) can be disposed in the multiple wellbores. Each receiver (i.e., the first receiver 114, the second receiver 116) can receive electromagnetic signals transmitted by the multiple transmitters. For example, the first transmitter 102 and the second transmitter 104 can be disposed in a pre-existing production wellbore 110, and can be spaced apart by a distance ranging between 2 feet and 50 feet. The first receiver 114 and the second receiver 116 can be disposed in a SAGD wellbore 122 being drilled, and can be spaced apart by a distance ranging between 2 feet and 50 feet. In sum, at least two transmitters and at least two receivers can be disposed in at least two wellbores to implement full compensation.

In some implementations, the first receiver 114 and the second receiver 116 can be affixed to a Measuring While Drilling (MWD) tool 126 disposed in the SAGD wellbore 122. Alternatively, or in addition, the sensors can be affixed to a production logging tool, outside the casings on special housings, inside the casing to transmit or receive from the formation, in open-hole sections in the wells, or in combinations of them. The sensors can alternatively or in addition be placed on a production tool inside the casing. A casing can be all or portions of one or more casing strings disposed in the wellbore.

Figure 1D:
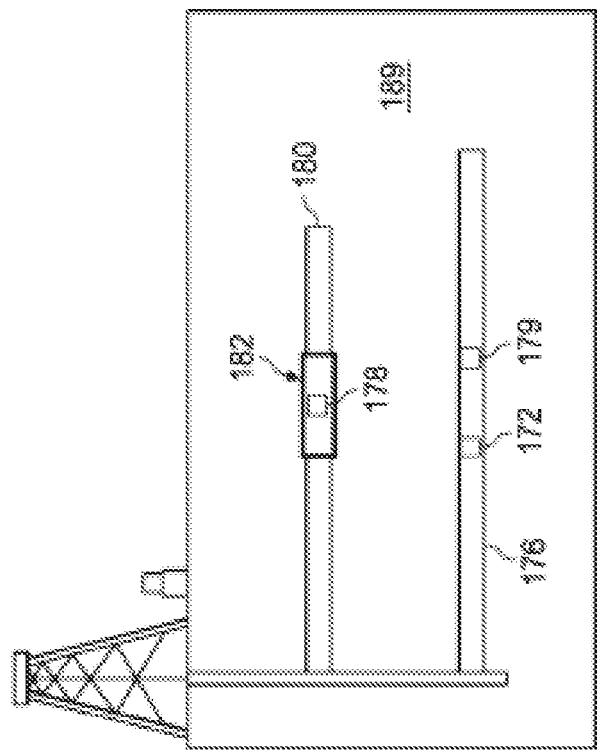
Figure 1C:
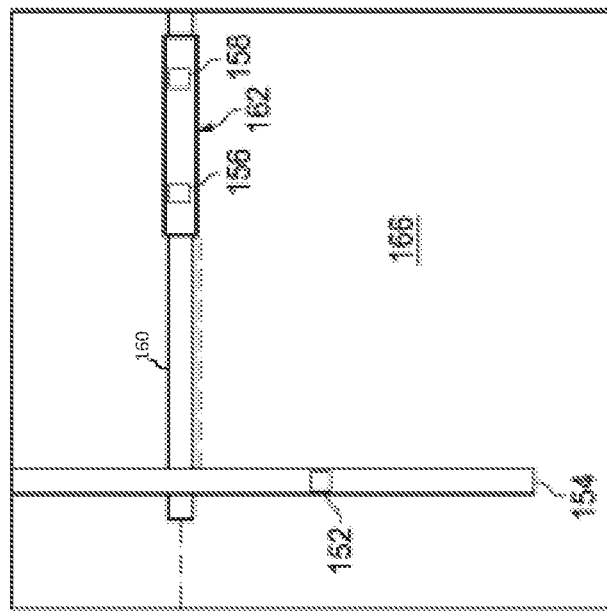

FIGS. 1C and 1D are schematic, elevation views illustrating examples of multiple wellbores for ranging implementing partial compensation. In some implementations, a first transmitter 152 can be disposed in a first wellbore 154 (for example, a pre-existing production wellbore) to transmit electromagnetic signals. A first receiver 156 can be disposed in a second wellbore 160 (for example, a SAGD wellbore) to receive the electromagnetic signals transmitted by the first transmitter. Either a second transmitter or a second receiver can be disposed in either the first wellbore or the second wellbore to exchange electromagnetic signals with the first transmitter and the first receiver. For example, as shown in FIG. 1C, the first receiver 156 and a second receiver 158 can be disposed on a MWD tool 162 in the second wellbore 160. In another example, as shown in FIG. 1D, a first transmitter 172 and a second transmitter 179 can be disposed in a pre-existing production wellbore 176 to exchange electromagnetic signals with a receiver 178 disposed on a production logging tool 182 disposed in a SAGD wellbore 180. In sum, at least a first transmitter, at least a first receiver, and either a second transmitter or a second receiver can be disposed in at least two wellbores to implement partial compensation.

The configuration of the first wellbore relative to the second wellbore (for example, the arrangement of the wellbore 110 relative to the wellbore 122, the arrangement of the wellbore 112 relative to the wellbore 124, the arrangement of the wellbore 154 relative to the wellbore 160, or the arrangement of the wellbore 176 relative to the wellbore 180), and the arrangement of transmitters and receivers in the first wellbore and the second wellbore are exemplary. Several other configurations are possible. For example, in both partial and full compensation implementations, more than two transmitters and more than two receivers can be disposed in the second wellbore 122 and the first wellbore 110, respectively. In this case, compensation may be performed in fours. A transmitter and a receiver can be disposed in the same wellbore in both partial and full compensation implementations. The first wellbore is substantially perpendicular to the second wellbore, for example, in the formation 140 (FIG. 1A) or in the formation 166 (FIG. 1C). Alternatively, as shown in the formation 150 (FIG. 1B) or in the formation 189 (FIG. 1D), a third wellbore can be substantially parallel to a fourth wellbore.

One of the two wellbores can be a production wellbore in which one or more transmitters are disposed. The other wellbore can be an injection wellbore in which a tool (for example, a MWD tool 128) is disposed. In a full compensation implementation, multiple receivers (for example, a third receiver 118 and a fourth receiver 120) can be disposed in the fourth wellbore 124, for example, affixed to the MWD tool 128. In a partial compensation implementation, one transmitter 178 can be affixed to a tool (for example, the production logging tool 182) in the wellbore 180. In some implementations, the wellbores formed in the formation can be at any angle to each other instead of being either substantially parallel or substantially perpendicular. Transmitters and receivers can be interchangeably disposed in any wellbore. In sum, the techniques described here can be implemented in ranging wellbores of any configuration by disposing the sensors (i.e., the transmitters and the receivers) in any of the two wellbores.

In some full compensation implementations, the first transmitter 102, the first receiver 114 and the second receiver 116 can be disposed in the first wellbore 110 and the second wellbore 122 (FIG. 1A) such that an angle formed by a first line connecting the first receiver 114 and the first transmitter 102 and a second line connecting the second receiver 116 and the first transmitter 102 satisfies a threshold angle, which, in some implementations, can be at least 5 degrees. Similarly, the third transmitter 106, the third receiver 118 and the fourth receiver 120 can be disposed in the third wellbore 112 and the fourth wellbore 124 such that an angle formed by a line connecting the third receiver 118 and the third transmitter 106, and a line connecting the fourth receiver 120 and the third transmitter 106 satisfies the threshold angle. In some implementations, the positions of the transmitters and the receivers in the multiple wellbores can be periodically changed, for example, as one of the wellbores is being formed relative to the other existing wellbore, such that the angle described above is maintained to satisfy the threshold angle. The sensitive volume of the sensing system can include a trapezoidal shape that is formed by connecting the two transmitters and the two receivers in each case. To increase the coverage, more than two transmitters and more than two receivers may be used.

Figure 2:
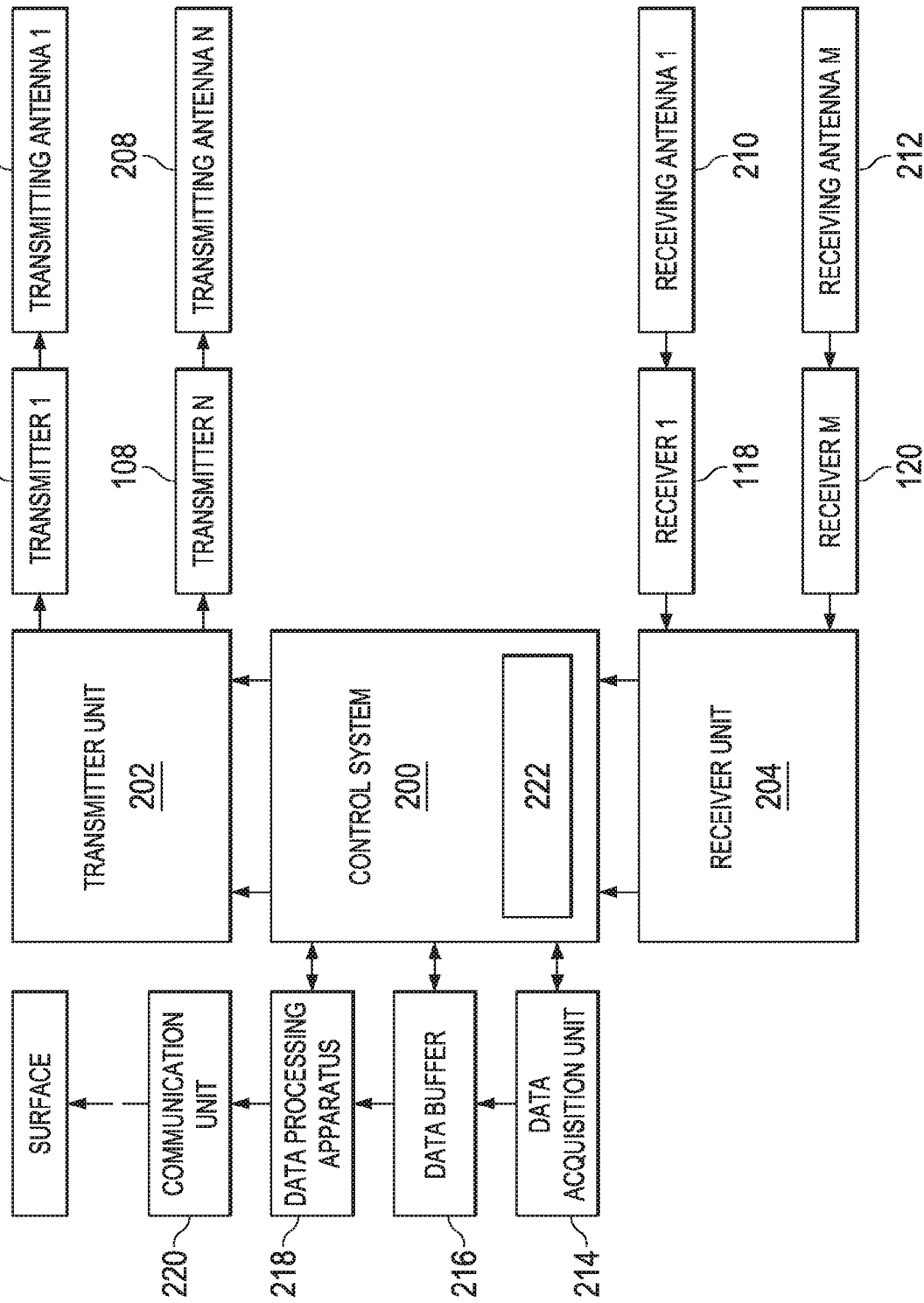
FIG. 2 is a block diagram of an example of a system for ranging in multiple wellbores.

FIG. 2 is a block diagram of an example of a control system 200 for ranging in multiple wellbores that can implement either partial compensation or full compensation or both. The control system 200 can be implemented as a computer system (for example, a desktop computer, a laptop computer, a tablet computer, a personal digital assistant, a smartphone, and the like) that executes computer instructions stored on a computer-readable medium 222 to perform the operations described here. The control system 200 can be connected to a transmitter unit 202 and a receiver unit 204. Each of the transmitter unit 202 and the receiver unit 204 can be implemented as computer instructions stored on the computer-readable medium 222 and executable in response to instructions from the control system 200. The transmitter unit 202 can be connected to the multiple transmitters disposed in the wellbores (for example, the transmitter 106, the transmitter 108). The receiver unit 204 can be connected to the multiple receivers disposed in the wellbores (for example, the receiver 118, the receiver 120).

Each transmitter can be connected to or can include a respective transmitting antenna (for example, a transmitting antenna 206 connected to the transmitter 106, a transmitting antenna 208 connected to the transmitter 108, other transmitting antennas connected to respective transmitters). Similarly, each receiver can be connected to or can include a respective receiving antenna (for example, a receiving antenna 210 connected to the receiver 118, a receiving antenna 212 connected to the receiver 120, other receiving antennas connected to respective receivers). In some implementations (including the partial compensation and full compensation implementations), the control system 200 can cause the one or more transmitting antennas to produce EM excitation signals in the surrounding formations, for example, using the transmitter unit 202. The control system 200 can cause the one or more receiving antennas to receive the EM excitation signals produced by the multiple transmitting antennas, for example, using the receiver unit 204. The EM signals received by the receiving antennas are affected by properties of the formation in which the transmitters and the receivers are disposed. The excitation signals for the transmitting antennas can be single frequency or broad-band. For broad-band excitations, receivers can record the time domain signals and compute the associated frequency domain signals via Fourier transform.

The control system 200, which is connected to the multiple transmitters and the multiple receivers, can receive the multiple signals, each of which is a representation of each signal received by each receiver from each transmitter. For example, the control system 200 can receive each signal as a complex voltage. The control system 200 can store the multiple signals in a computer-readable storage medium (for example, the computer-readable medium 222). The control system 200 can implement partial compensation or full compensation techniques (described below) on the multiple signals resulting in multiple compensated signals. The control system 200 can store the multiple compensated signals in the computer-readable storage medium. The control system 200 can process the multiple compensated signals to determine a position of the first wellbore (for example, the wellbore 110) relative to the second wellbore (for example, the wellbore 122), and provide the position, for example, to a display device (not shown) connected to the control system 200.

In full compensation implementations, the control system 200 can implement the compensation technique based on EM signals transmitted by at least two transmitters and received by at least two receivers. To do so, from the signals exchanged by the at least two transmitters and the at least two receivers, the control system 200 can determine multiple compensated signals. The control system 200 can determine at least one compensated signal from a first signal received from a first wellbore and a second signal received from a second wellbore. Each of the transmitters and the receivers provides both amplitude and phase measurements. The control system 200 can measure a value of each EM signal, i.e., measure an amplitude and phase of each EM signal, for example, by digitizing the signal. In the example configurations described in FIG. 1B, the control system 200 can obtain four measurements from the two transmitters disposed in the production wellbore and the two receivers disposed in the injection wellbore—from transmitter 106 to receiver 118, from transmitter 106 to receiver 120, from transmitter 108 to receiver 118, and from transmitter 108 to receiver 120. The control system 200 can receive the measurements as complex voltages, each having an amplitude and a phase.

From these measurements, the control system 200 can obtain an R value, which is a signal ratio. For example, at a first time instant, the control system 200 can determine a first product of a value of a first signal transmitted by the transmitter 106 to receiver 118 (T1R1) and a value of a second signal transmitted by transmitter 108 to receiver 120 (T2R2). At the first time instant, the control system 200 can also determine a second product of a value of a third signal transmitted by the transmitter 106 to receiver 120 (T1R2) and a value of a fourth signal transmitted by the transmitter 108 to receiver 118 (T2R1). The control system 200 can divide the first product by the second product resulting in a first compensated signal. The R value, which indicates formation properties, changes over time for ranging applications.

A compensated signal has the capability of cancelling any multiplicative effects for transmitters or receivers in the form $V'_{TXRY}{}^t = C_{TX}{}^t C_{RY}{}^t V_{TXRY}{}^t$, where V' is the voltage that is affected by the multiplicative effect on transmitter X ($C_{TX}$) and V is the ideal measurement with no effects. When the control system 200 determines the four term ratio of the signals as described above, multiplicative effects cancel out as shown below:

$$R(t) = \frac{V'^t_{T1R1} V'^t_{T2R2}}{V'^t_{T1R2} V'^t_{T2R1}} = \frac{C^t_{T1} C^t_{R1} V^t_{T1R1} C^t_{T2} C^t_{R2} V^t_{T2R2}}{C^t_{T1} C^t_{R2} V^t_{T1R2} C^t_{T2} C^t_{R1} V^t_{T2R1}} = \frac{V^t_{T1R1} V^t_{T2R2}}{V^t_{T1R2} V^t_{T2R1}}$$

Similarly, to operations performed at the first time instant, at a second time instant, the control system 200 can determine a third product of a value of a fifth signal transmitted by the transmitter 106 and received by the receiver 118 and a value of a sixth signal transmitted by the transmitter 108 and received by the receiver 120. At the second time instant, the control system 200 can determine a fourth product of a value of a seventh signal transmitted by the transmitter 106 and received by the receiver 120 and a value of an eighth signal transmitted by the transmitter 108 and received by the receiver 118. The control system 200 can divide the third product by the fourth product resulting in a second compensated signal. In this manner, the control system 200 can take a difference in time to obtain a time-lapse measurement, for example, between the first time instant and the second time instant.

Between the first time instant and the second time instant, the multiple transmitters and the multiple receivers can be stationary. Alternatively, either the multiple transmitters or the multiple receivers (or both) can be moved between the first time instant and the second time instant. A decision to move the transmitters or receivers (or both) or keep the transmitters or receivers (or both) stationary can depend on a length of the wellbore (for example, the injection wellbore) that has been drilled between the first time instant and the second time instant. For example, if the multiple receivers are affixed to the MWD tool, which is moved as the wellbore is being drilled, then the multiple receivers can move between the first time instant and the second time instant. If an angle (described above) formed by the multiple receivers with a transmitter no longer satisfies the threshold after the MWD tool has moved, then the transmitters can also be moved.

In some implementations, at the instant that the control system 200 causes the transmitters to transmit the EM signals and the receivers to receive the EM signals, the receivers and the transmitters can be stationary. Alternatively, either one or more of the transmitters or one or more of the receivers (or both) can be mobile during EM signal transmission and reception. In this manner, the control system 200 can receive the multiple signals from multiple first locations of the transmitters and the receivers, and multiple other signals from multiple second locations to which the multiple transmitters and the multiple receivers are moved in the wellbores.

The control system 200 records the compensated signal as a function of time. In general, a function $f$ can be used before the subtraction as shown below:

$$R(t) = \frac{V'^t_{T1R1} V'^t_{T2R2}}{V'^t_{T1R2} V'^t_{T2R1}}$$

$$S(t_1, t_2) = f(R(t_1)) - f(R(t_2))$$

In partial compensation implementations, the control system 200 can implement the compensation technique based on EM signals exchanged between at least one transmitter, at least one receiver, and either a transmitter or a receiver. In implementations with two transmitters and a receiver, two measurements are possible—from transmitter 172 to receiver 178 (T1R1) and from transmitter 179 to receiver 178 (T2R1). In implementations with two receivers and a transmitter, two measurements are possible—from transmitter 152 to receiver 156 (T1R1) and from transmitter 152 to receiver 158 (T1R2). The control system 200 can receive the EM signals as are complex voltages, each having a respective amplitude and a phase. In the example with two transmitters and one receiver, to determine an R (ratio) value, the control system 200 can divide a value (i.e., a voltage value) of a first signal transmitted by transmitter 172 to receiver 178 (T1R1) by a value of a second signal transmitted by transmitter 179 to receiver 178 (T2R1). When the control system 200 takes the two term ratio of the signals, multiplicative effects cancel out as shown below, resulting in a first compensated signal:

$$R^R(t) = \frac{V_{T1R1}^{\prime t}}{V_{T2R1}^{\prime t}} = \frac{C_{T1}^t C_{R1}^t V_{T1R1}^t}{C_{T2}^t C_{R1}^t V_{T2R1}^t} = \frac{C_{T1}^t V_{T1R1}^t}{C_{T2}^t V_{T2R1}^t}$$

The control system 200 can implement the afore-described partial compensation techniques at a first time instant. At a second time instant, the control system 200 can divide a value of a third signal transmitted by transmitter 172 to receiver 178 by a value of a fourth signal transmitted by transmitter 179 to receiver 178. The control system 200 can divide the third signal by the fourth signal resulting in a second compensated signal. The R value, which indicates formation properties, changes over time for ranging applications. Partially compensated signal has the capability of canceling any multiplicative effects for either transmitters in the following form:

$$V'_{TXRY}{}^t = C_{TX}{}^t C_{RY}{}^t V_{TXRY}{}^t$$

In the equation above, V' is the voltage that is affected by the multiplicative effect on transmitter X ($C_{TX}$) and V is the ideal measurement with no effects.

Similarly, in the example with two receivers and one transmitter, to determine an R (ratio) value, the control system 200 can divide a first signal transmitted by transmitter 152 to receiver 156 (T1R1) by a value of a second signal transmitted by transmitter 152 to receiver 158 (T1R2). When the control system 200 takes the two term ratio of the signals, multiplicative effects cancel out as shown below:

$$R^T(t) = \frac{V_{T1R1}^{\prime t}}{V_{T1R2}^{\prime t}} = \frac{C_{T1}^t C_{R1}^t V_{T1R1}^t}{C_{T1}^t C_{R2}^t V_{T1R2}^t} = \frac{C_{R1}^t V_{T1R1}^t}{C_{R2}^t V_{T1R2}^t}$$

The control system 200 can implement the afore-described partial compensation techniques at a first time instant. At a second time instant, the control system 200 can divide a value of a third signal transmitted by transmitter 152 to receiver 156 by a value of a fourth signal transmitted by transmitter 152 to receiver 158. Similarly to full compensation, the received signal, in partial compensation, can be recorded as a function of time, and a difference in time can be taken to obtain a time-lapse measurement.

$$S(t_1,t_2) = f(R(t_1)) - f(R(t_2))$$

In this equation, R can be uncompensated, partially compensated or fully compensated depending on the type of compensation technique that the control system 200 implements. One example of the function $f$ is the identity function, i.e., $f(x)=x$. Another example for the function $f$ is the logarithmic function, which makes S indicate the logarithmic change in the signal levels between the first time instant (i.e., $t_1$) and the second time instant (i.e., $t_2$). Other examples of the function $f$ are also possible. Further, in some implementations, the control system 200 can determine a second difference of measurements at three time instants.

In some implementations, the control system 200 can be connected to a data acquisition unit 214 to receive signals received by the control system 200 from the receiver unit 204. As an alternative or in addition to storing the signals in the computer-readable medium 222, the signals can be stored in a data buffer 216 connected to the control system 200 and the data acquisition unit 214. The processor (for example, a data processing apparatus 218) can be implemented as a component of the control system 200 or can reside external to the control system 200 (or both). To provide the position of the first wellbore relative to the second wellbore, for example, to a display device at the surface, the control system 200 can be connected to a communication unit 220, which can transmit data using either wired or wireless networks (or both). For example, the communication unit 220 can be implemented as a telemetry system.

In the example operations described with reference to the control system 200, the compensation technique is implemented as computer operations. Alternatively or in addition, the compensation technique can be implemented using hardware or firmware. For example, the ratios used in the compensation technique can be calculated by hardware by measuring phase difference and attenuation between the receivers instead of (or in addition to) measuring the absolute signals. Additional time-lapse processing can also be applied on the compensated signal. The control system 200 can be implemented down hole or at the surface.

Figure 3:
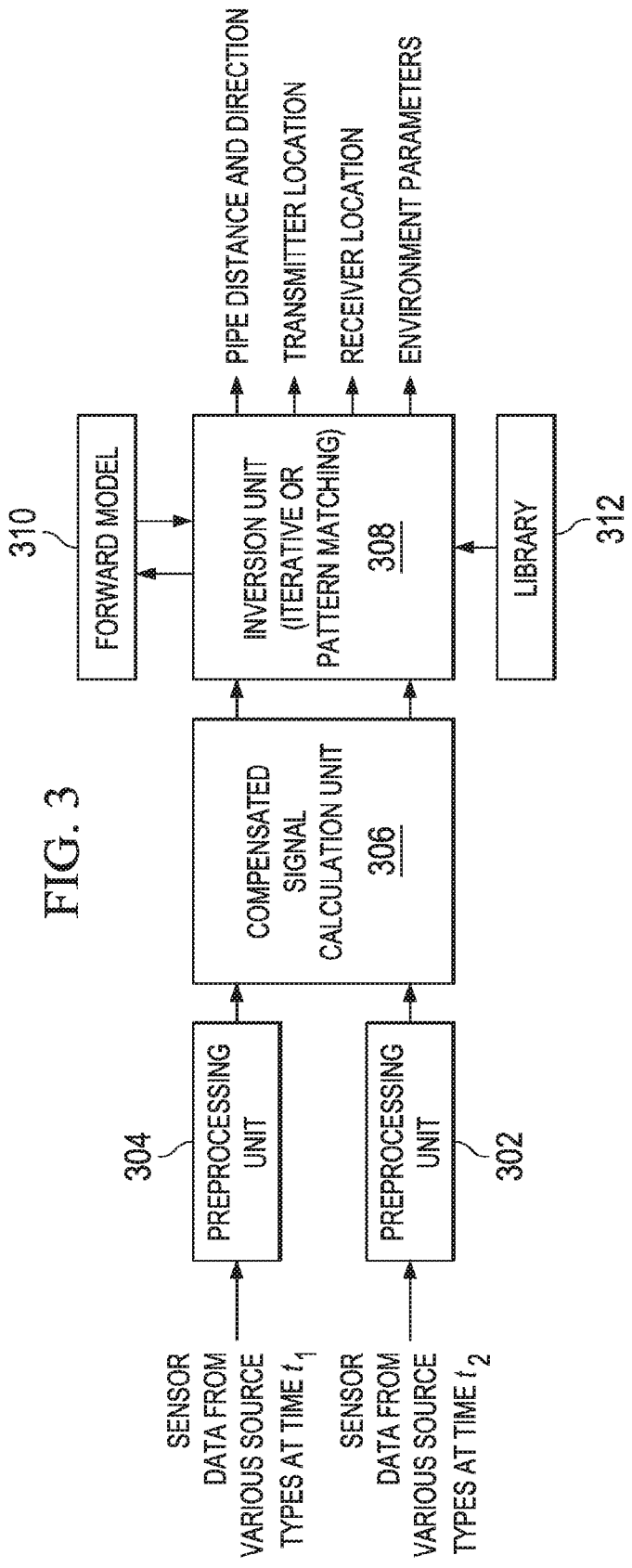
FIG. 3 is an example operational chart that shows relationships between processing, compensation, and inversion units.

FIG. 3 is an example of a preprocessing unit for preprocessing electromagnetic signals before partial compensation or full compensation. As shown in FIG. 3, the control system 200 can include multiple components for preprocessing, each of which can be implemented as a computer-readable medium storing instructions executable by the processor (for example, the data processing apparatus 218). In some implementations, the control system 200 can implement preprocessing techniques on the multiple signals received from the one or more transmitters before implementing the compensation techniques. For example, a first preprocessing unit 304 can receive sensor data from multiple sources (i.e., the transmitters) at time $t_1$, i.e., the first time instant. A second preprocessing unit 302 can receive sensor data from multiple sources (i.e., the transmitters) at time $t_2$, i.e., the second time instant. In some implementations, a compensated signal calculation unit 306 can implement resistivity logging signal processing techniques, for example, multi-component synthesis, differential signal synthesis, virtual arrays created from depth/time delayed data, or combinations of them. The preprocessing can include filtering with respect to time or depth to improve signal to noise ratio. The preprocessing can additionally include multi-array synthesis by combining information from different sensor positions. The preprocessing can also include azimuthal binning and multi-bin processing to obtain dipole tensor components as well known in Logging While Drilling propagation induction resistivity well logging. Preprocessing can also include calibration operation utilizing past measurements or predicted position (or both) of moving sensor system or environmental conditions.

Alternatively, or in addition, the control system 200 can implement an inversion unit 308 based on the compensated signal via forward modeling (for example, that uses a forward model 310) and feedback (for example, that uses a library 312). The inversion units accept the compensated signals as the input and outputs pipe or environmental parameters such as pipe distance and direction, transmitter location, receiver location, environmental parameters, and the like. Based on the difference between input signals and the modeling result, variable set of output parameters can be adjusted to reduce the difference. The afore-described operations can be iterated and stopped once the difference reduces and satisfies a threshold. Alternatively, or in addition, a look-up table that maps the input to output parameters can be computed and used. Parameters including pipe distance and direction, transmitter location, wellbore size, and other environmental parameters can be obtained by implementing preprocessing.

Figure 4A:
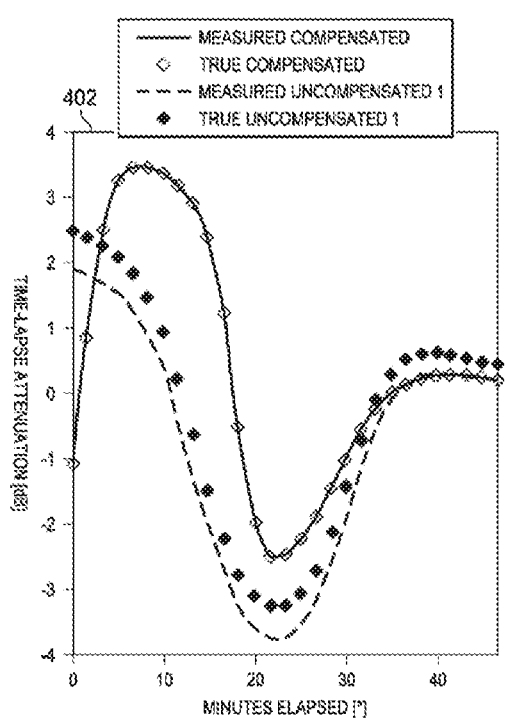
FIGS. 4A and 4B are plots comparing compensated and uncompensated electromagnetic signals.
Figure 4B:
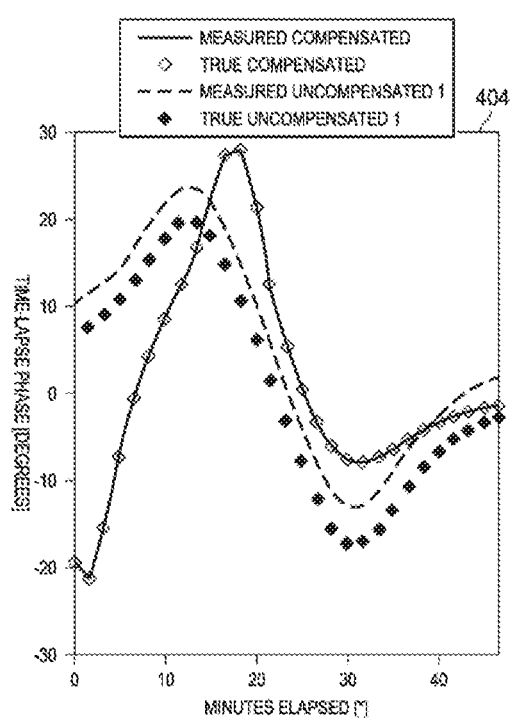

FIGS. 4A and 4B are plots comparing compensated and uncompensated electromagnetic signals. The electromagnetic signals received by the receivers are used to determine the distance between the two wellbores in which the transmitters and the receivers are disposed. In the case of no time-lapse signal measurement, a high signal can indicate that the wells are close and a low signal can indicate that the wells are far apart. In the case of time-lapse signal measurement, a high signal can indicate that the wells are getting closer and a low signal can indicate that the separation between the wells is increasing. The inversion process described above can be the basis on which the interpretation of closeness from the compensated signals is made. The plots shown in FIGS. 4A and 4B are determined by ranging in the SAGD application. Plot 402 is a plot of time-lapsed attenuation versus time for measured compensated signals, true compensated signals, measured uncompensated signals, and true uncompensated signals. Plot 404 is a plot of time-lapse phase versus time for measured compensated signals, true compensated signals, measured uncompensated signals, and true uncompensated signals. The produced signal is used to determine the position of the receivers or equivalently the tool body with respect to a reference such as a location in the injector or producer wells, or a previously known position of the receiver. Although the receiver is moving in this example, the transmitter could alternatively or in addition be moving. In this example, an amplitude drift and phase draft is used on all of the receivers. The plots show that, despite the draft, the compensated measurement is not affected from phase shifts whereas uncompensated measurements are affected.

Figure 5:
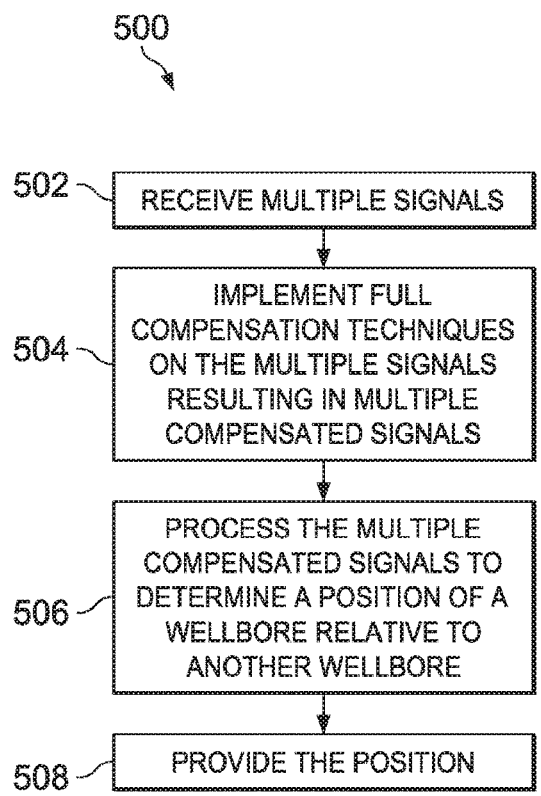
FIG. 5 is a flowchart of an example process for ranging from multiple wellbores implementing full compensation.

FIG. 5 is a flowchart of an example process 500 for ranging from multiple wellbores implementing full compensation. The process 500 can be implemented as computer instructions stored on computer-readable media (for example, the computer-readable medium 222) and executable by the processor (for example, data processing apparatus 218). For example, the process 500 can be implemented by the control system 200. At 502, multiple signals are received. Each signal corresponds to an electromagnetic signal received by a receiver of multiple receivers disposed in multiple wellbores from a transmitter of multiple transmitters disposed in the multiple wellbores.

At 504, full compensation techniques are implemented on the multiple signals resulting in multiple compensated signals. For example, from the received multiple signals, multiple compensated signals can be determined. At least one compensated signal can be determined from a first signal received from a first wellbore and a second signal received from a second wellbore of the plurality of wellbores. At 506, the multiple compensated signals are processed to determine a position of a first wellbore of the multiple wellbores relative to a second wellbore of the multiple wellbores. At 508, the position of the first wellbore relative to the second wellbore is provided.

Figure 6:
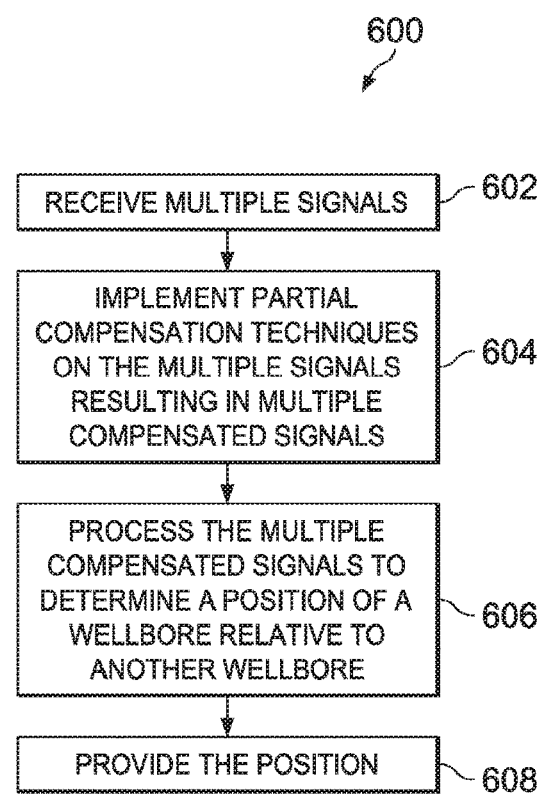
FIG. 6 is a flowchart of an example process for ranging from multiple wellbores implementing partial compensation.

FIG. 6 is a flowchart of an example process 600 for ranging from multiple wellbores implementing partial compensation. The process 600 can be implemented as computer instructions stored on computer-readable media (for example, the computer-readable medium 222) and executable by the processor (for example, the data processing apparatus 218). For example, the process 500 can be implemented by the control system 200. At 602, multiple signals are received. Each signal corresponds to an electromagnetic signal exchanged by a first transmitter disposed in a first wellbore to transmit electromagnetic signals, a first receiver disposed in a second wellbore to receive the electromagnetic signals transmitted by the first transmitter, and either a second transmitter or a second receiver. The second transmitter or the second receiver can be disposed in either the first wellbore or in the second wellbore or in a location other than the wellbore (for example, at the surface).

At 604, partial compensation techniques are implemented on the multiple signals resulting in multiple compensated signals. At 606, the multiple compensated signals are processed to determine a position of a first wellbore of the multiple wellbores relative to a second wellbore of the multiple wellbores. At 608, the position of the first wellbore relative to the second wellbore is provided.

A number of embodiments have been described. Nevertheless, it will be understood that various modifications may be made without departing from the spirit and scope of the invention.

What is claimed is:

1. A system for ranging in wellbores, the system comprising:
   a first transmitter, disposed in a first wellbore of a plurality of wellbores, and configured to transmit electromagnetic signals;
   a first receiver, disposed in a second wellbore of the plurality of wellbores, and configured to receive the electromagnetic signals transmitted by the first transmitter;
   either a second transmitter or a second receiver disposed in either the first wellbore or the second wellbore to communicate the electromagnetic signals with the first transmitter or the first receiver; and
   a processor connected to the first transmitter, the first receiver, and either the second transmitter or the second receiver, the processor configured to:
     receive a plurality of signals communicated by the first transmitter, the first receiver, and either the second transmitter or the second receiver, wherein the plurality of signals includes a signal that corresponds to an electromagnetic signal received by the first receiver from the first transmitter;
     implement compensation techniques on the plurality of signals resulting in a plurality of compensated signals;
     process the plurality of compensated signals to determine a position of the first wellbore of the plurality of wellbores relative to the second wellbore of the plurality of wellbores;
     provide the position of the first wellbore relative to the second wellbore; and
     control the position of the first wellbore relative to the second wellbore based on the provided position.

2. The system of claim 1, comprising the second transmitter, disposed in the first wellbore of the plurality of wellbores, and configured to transmit the electromagnetic signals, wherein the first receiver is disposed in the second wellbore to receive the electromagnetic signals transmitted by the second transmitter, and wherein the processor is further configured to receive an additional signal that corresponds to an additional electromagnetic signal received by the first receiver from the second transmitter.

3. The system of claim 2, wherein the processor is further configured, at a first time instant, to divide a value of a first signal transmitted by the first transmitter and received by the first receiver, by a value of a second signal transmitted by the second transmitter and received by the first receiver, resulting in a first compensated signal.

4. The system of claim 3, wherein the processor is further configured, at a second time instant, to divide a value of a third signal transmitted by the first transmitter and received by the first receiver, by a value of a fourth signal transmitted by the second transmitter and received by the first receiver, resulting in a second compensated signal.

5. The system of claim 4, wherein the processor is further configured to:
record the first compensated signal and the second compensated signal as a first function of time and a second function of time, respectively; and
obtain a time-lapse measurement between the first time instant and the second time instant.

6. The system of claim 5, wherein, to obtain the time-lapse measurement, the processor is configured to:
apply a logarithmic function to the first function of time;
apply a logarithmic function to the second function of time; and
determine a difference between the logarithmic function applied to the first function of time and the logarithmic function applied to the second function of time.

7. The system of claim 1, comprising the second receiver, disposed in the second wellbore of the plurality of wellbores, and configured to receive the electromagnetic signals transmitted by the first transmitter, and wherein the processor is further configured to receive an additional signal that corresponds to an additional electromagnetic signal received by the second receiver from the first transmitter.

8. The system of claim 7, wherein the processor is further configured to divide a value of a third signal transmitted by the first transmitter and received by the first receiver, by a value of a fourth signal transmitted by the first transmitter and received by the second receiver, resulting in a second compensated signal.

9. The system of claim 7, wherein the first wellbore is a steam-assisted gravity drainage (SAGD) wellbore being drilled, and wherein either the first receiver or the first transmitter or the second receiver or the second transmitter is disposed in the SAGD wellbore.

10. The system of claim 9, wherein the second wellbore is a pre-existing production wellbore, and wherein either the first receiver or the first transmitter or the second receiver or the second transmitter is disposed in the pre-existing production wellbore.

11. The system of claim 9, further comprising a measurement while drilling (MWD) tool in the SAGD wellbore, wherein a combination including at least two of the first receiver, the first transmitter, the second receiver, or the second transmitter are affixed to and spaced apart on the MWD tool.

12. The system of claim 7, wherein the processor is further configured to measure a value of each of the plurality of signals as a complex voltage.

13. The system of claim 7, wherein the processor is configured to:
receive the plurality of signals received by the first receiver and the second receiver disposed at a first location and a second location, respectively, within the second wellbore from the first transmitter disposed at a third location within the first wellbore; and
receive another plurality of signals received by the first receiver and the second receiver moved to a fourth location and a fifth location, respectively, within the second wellbore from the first transmitter disposed at the third location.

14. The system of claim 1, further comprising a non-transitory computer-readable storage medium to store the plurality of signals and the plurality of compensated signals.

15. A non-transitory computer-readable medium storing instructions executable by a processor to perform operations for ranging in wellbores, the operations comprising:
receiving a plurality of signals communicated between a first transmitter, disposed in a first wellbore of a plurality of wellbores, and configured to transmit electromagnetic signals, a first receiver, disposed in a second wellbore of the plurality of wellbores, and configured to receive the electromagnetic signals transmitted by the first transmitter, and either a second transmitter or a second receiver, disposed in either the first wellbore or the second wellbore, and configured to communicate the electromagnetic signals with the first transmitter or the first receiver, wherein the plurality of signals includes a signal that corresponds to an electromagnetic signal received by the first receiver from the first transmitter;
implementing compensation techniques on the plurality of signals resulting in a plurality of compensated signals;
processing the plurality of compensated signals to determine a position of the first wellbore of the plurality of wellbores relative to the second wellbore of the plurality of wellbores;
providing the position of the first wellbore relative to the second wellbore; and
controlling the position of the first wellbore relative to the second wellbore based on the provided position.

16. A method for ranging in wellbores, the method comprising:
receiving, by a processor, a plurality of signals communicated between a first transmitter, disposed in a first wellbore of a plurality of wellbores, and configured to transmit electromagnetic signals, a first receiver, disposed in a second wellbore of the plurality of wellbores, and configured to receive the electromagnetic signals transmitted by the first transmitter, and either a second transmitter or a second receiver, disposed in either the first wellbore or the second wellbore, and configured to communicate the electromagnetic signals with the first transmitter and the first receiver, wherein the plurality of signals includes a signal that corresponds to an electromagnetic signal received by the first receiver from the first transmitter;
implementing, by the processor, compensation techniques on the plurality of signals resulting in a plurality of compensated signals;
processing, by the processor, the plurality of compensated signals to determine a position of the first wellbore of the plurality of wellbores relative to the second wellbore of the plurality of wellbores;
providing, by the processor, the position of the first wellbore relative to the second; and
controlling the position of the first wellbore relative to the second wellbore based on the provided position.

* * * * *